Jan. 13, 1970   W. T. S. MONTGOMERY   3,489,111
BOILER FUEL RECLAMATION SYSTEM

Filed Oct. 6, 1967   5 Sheets-Sheet 3

INVENTOR
W. T. S. MONTGOMERY

BY Bartholomew Diggins
ATTORNEY

INVENTOR
W. T. S. MONTGOMERY

United States Patent Office
3,489,111
Patented Jan. 13, 1970

3,489,111
BOILER FUEL RECLAMATION SYSTEM
William T. S. Montgomery, Jacksonville, Fla., assignor to Jacksonville Blow Pipe Company, Jacksonville, Fla., a corporation of Florida
Continuation-in-part of application Ser. No. 402,892, Oct. 9, 1964. This application Oct. 6, 1967, Ser. No. 675,750
Int. Cl. F23j 3/04; B04c 5/185
U.S. Cl. 110—165          14 Claims

ABSTRACT OF THE DISCLOSURE

The boiler fuel reclamation system includes a separator for removing sand from fly ash charcoal in a wood or bark burning boiler and a novel system for employing stack gas or air to convey sand and fly ash charcoal through the separator and for returning the charcoal to the boiler firebox. A novel, programmed double dump valve unit facilitates the gravity discharge of light sand and fly ash charcoal from the low pressure area of a collecting hopper into the high pressure area of a gas conveying tube.

---

This application constitutes a continuation-in-part application of my earlier application U.S. Ser. No. 402,892, filed Oct. 9, 1964, now abandoned.

HISTORY

In many industrial operations, boilers are fueled by burning bark. This bark is oftentimes obtained from trees growing in sandy country wherein the sand not only impinges on the outside of the bark, but as the tree grows, the bark grows over the sand in such a manner as to have the sand permeate throughout the bark. This sand containing bark, which fuels these bark burning boilers, results in a char (fly ash charcoal) which floats about in the fire of the bark burning boiler. This char is prevented from going up the smoke stack by a battery of cyclone dust collectors and hoppers which are suitably placed to collect the char. The collected char is then reinjected into the firebox of the boiler as additional fuel by means of steam jets.

One would think that sand being heavy would settle to the bottom of the bark burning boiler, but this is not the case. The sand is instead carried about by hot gases within the boiler firebox and is caught in the dust collectors catching the char and is then reinjected into the firebox of the boiler along with the char. The result is that this very abrasive sand is circulated throughout the boiler and acts in the same manner as a sand blasting machine against the boiler, tubes, dust collectors, etc. This problem is complicated by the fact that greater and greater percentages of sand accumulate inside the boiler as the char is consumed as fuel. Furthermore, the steam used to reinject the char into the firebox of the boiler is objectionable, not only because it has a dampening effect on the fire, but also because it adversely affects the beneficial characteristics of radiant heat which is absorbed by the water walls of the boiler.

Because of the very detrimental effect of the sand, it has heretofore been the procedure to periodically divert all the materials inside the boiler including the accumulated sand, to the outside to be taken away and disposed of. Thereafter, the process would start all over again and a new supply of sand would begin to accumulate in the boiler. These periodic interruptions in the operations of the boiler were expensive and very unsatisfactory, and in some cases, no effort at all was made to recover the char and it was disposed of along with the sand. This was an unsatisfactory solution to the problem, because when one attempts to dispose of char in a manner other than burning it, it results in air pollution and char is dispersed over surrounding communities by the wind. Furthermore, the fuel value of the char is lost.

Another unsatisfactory attempt to solve this problem has been by the use of shaker screens built inside the boilers. Unfortunately, the violent power of the hot gases circulating inside these boilers did not allow such an easy solution to the problem.

To effectively remove the sand from the char and recover the char for further use as fuel, it was necessary to discharge the mixture from the charcoal hoppers and accomplish separation without interrupting the operation of the boiler. However, this discharge of the fly ash charcoal and sand is very difficult to accomplish during boiler operation.

Many presently known ash discharge systems are designed for use with boilers or gas generators wherein the pressure within the initial ash containing chamber is greater than that in the ash discharge compartments designed to subsequently receive the ash. In these systems, the problem is to effectively discharge the ash while maintaining the positive pressure in the initial ash containing boiler or gasification chamber. To solve this problem, ash discharge locks have been employed to achieve pressure equalization. These locks, which are generally positioned below the boiler or gas generator, are placed in communication with the pressurized chamber by means of an ash discharge opening to equalize the pressure between such chamber and the lock so that the ash is subsequently allowed to trickle by gravity through the discharge opening into the lock. Subsequently, the lock is again sealed, the pressure discharged therefrom, and the ash is then removed from the lock.

In a bark burning boiler, a different problem exists which cannot be remedied by the conventional pressure locks normally employed with boilers and gas generators. In these boilers, to accomplish sand separation, it is necessary to remove dry sand and charcoal ash from a hopper positioned below a dust collector inside the boiler. Preferably, this ash removal must occur by gravity, but the combination of dry sand and fly ash charcoal found in such boilers is extremely light. An air stream of extremely light velocity will move this combination of materials readily, and any higher pressure beneath the hopper will prevent the gravity discharge of the sand and fly ash charcoal contained therein.

Previously, it has been practically impossible to effectively empty by gravity the collector hopper of a bark burning boiler. At the bottom of the cyclone collectors in such boilers the induced draft in the boiler may create a pressure which prevents effective discharge of the contents of the collector. However, even more important is the fact that the sand and fly ash charcoal must be conveyed by a discharge pipe to a screening cyclone for sand separation, and the conveying gas in this pipe creates a higher pressure in the pipe than that present in the hopper. Thus, if a dump valve at the bottom of the hopper is employed to discharge by gravity the fly ash charcoal and sand in the hopper, this positive pressure provides sufficient compression of air on the underside of the dump valve to cause an upward, low velocity stream of air when the valve is opened. This stream of air, although of low velocity, is sufficient to prevent the charcoal and sand from dropping by gravity from the hopper under the dust collector, and as a result, such hoppers become plugged with charcoal and sand. The mere opening of a valve between the hopper and a lock chamber below the hopper does not, therefore, result in the effective gravity flow of residue from the hopper due to the higher pressure which would normally be present in the lock chamber.

The primary object of this invention is to provide a system for separating and removing sand from charcoal (char) which is to be reinjected as fuel in bark burning boilers.

Another object of this invention is to eliminate the abrasiveness to bark burning boiler systems caused by sand within said systems.

Yet another object of this invention is to provide a cleaner bark burning boiler operation by elimination of the escape of char (charcoal) or fly ash from said boilers.

Still another object of this invention is to increase the steam output from bark burning boilers by eliminating the use of steam for reinjecting char as a fuel in said boilers.

A further object of this invention is to eliminate the adverse effect of steam on radiant heat in bark burning boilers.

Another object of this invention is to provide a program controlled double dump valve for effectively removing fly ash charcoal and sand from collector hoppers of a bark burning boiler.

A further object of this invention is to provide a novel and improved method for accomplishing the gravity flow of extremely light material from an area of lower pressure into an area of higher pressure.

Another object of this invention is to provide a novel and improved double dump valve for a bark burning boiler which includes means for equalizing the pressure on either side of each valve member of the double dump valve before a valve is opened to a gravity flow of discharge material.

A further object of the present invention is to provide a novel and improved double dump valve for bark burning boilers which includes a control system for pressure and valve control which programs the valve for a predetermined sequence of operation.

A still further object of this invention is to provide a novel and improved double dump valve for bark burning boilers which effectively prevents the rise of fly ash charcoal and sand which is passed to an area of higher pressure.

The above and further objects and details of this invention will be readily apparent upon a consideration of the following specification taken with the accompanying drawings in which:

Figure 1:
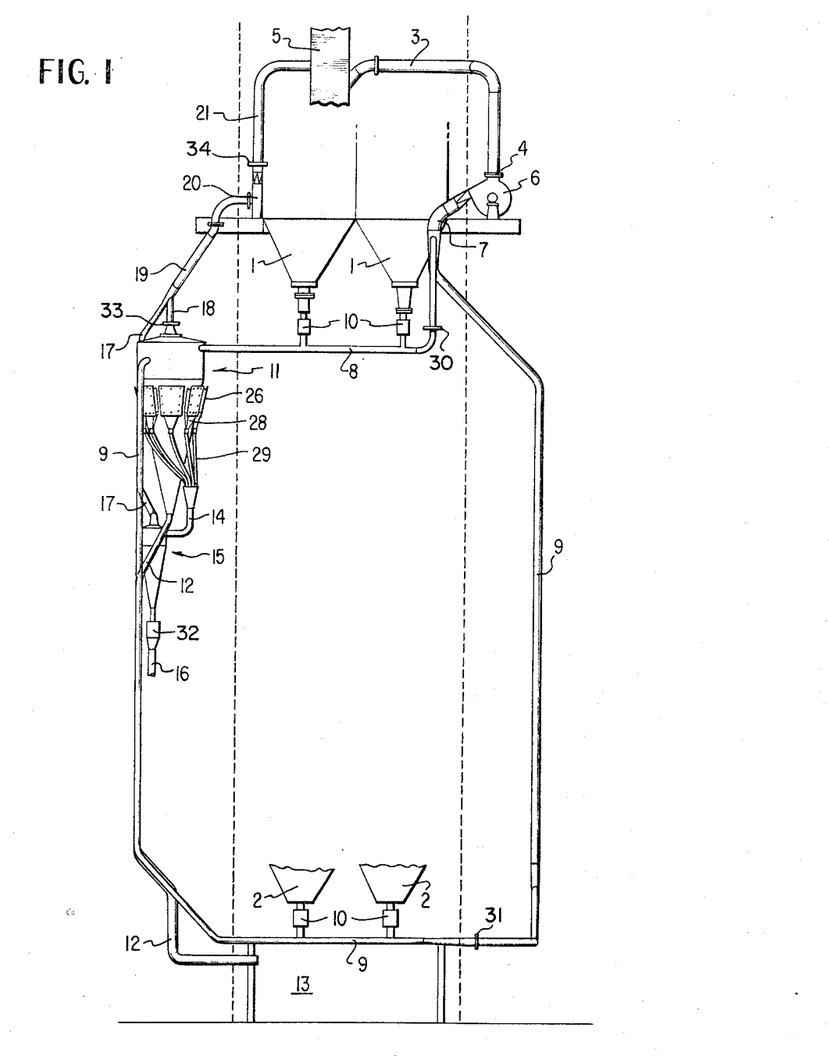
FIGURE 1 is a diagrammatic view of the boiler fuel reclamation system of the present invention.

Referring now to FIGURE 1, the sand and char mixture produced by fuel combustion in a bark burning boiler (indicated by broken lines) is entrapped by dust collecting hoppers 1 and other fuel path hoppers 2. To collect the materials in these hoppers, there is provided a gas intake tube 3 containing a gas flow regulating valve 4 which is adapted to draw gas from a stack 5, or alternatively from the atmosphere, to a blower 6. Several similar gas flow regulating valves are employed in the system, and such valves can be of any conventional design used to control gas flow. The blower 6 exhausts the gas into an exhaust tube 7 which divides into a dust collecting tube 8 and a fuel collecting tube 9. A gas flow regulating valve is provided in the entrant portion of the dust collecting tube to control gas flow velocity in this tube. The gas in the dust collecting tube 8 passes through a gas flow regulating valve 30 and collects the sand and char mixture from the dust collecting hoppers 1 through automatic double dump valves 10, while the gas in the fuel collecting tube 9 also passes through a gas flow regulating valve 31 and collects the sand and char mixture from fuel pass hoppers 2 through automatic double dump valves 10. The double dump valves 10 are of the same construction and will be subsequently described in greater detail. Both dust collecting tube 8 and fuel collecting tube 9 deliver the materials collected into a screening cyclone 11. The screening cyclone 11 separates the sand from the char and discharges the char by the char product discharge tube 12 which conveys the char to a firebox 13, wherein it acts as a fuel. The separated sand particles leave screening cyclone 11 by a sand carrier tube 14 which empties into a sand cyclone 15. Sand cyclone 15 collects the sand and discharges it to a sand discharge tube 16, through a dump valve 32. The sand discharge tube carries the sand to its place of disposition outside the boiler system. The gases which have carried these materials to the cyclone leave the sand cyclone 15 through gas outlet tube 17, and leave the screening cyclone 11 by a cyclone gas outlet tube 18. A gas flow regulating valve 33 controls the pressure differential between the cyclones 11 and 15 to control sand separation. Both said gas outlet tube 17 and cyclone gas outlet tube 18 combine to form joint outlet tube 19 which leads to blower 20. Blower 20 exhausts the gases through a gas exit tube 21, containing a gas flow regulating valve 34, and terminates in stack 5.

Figure 5:
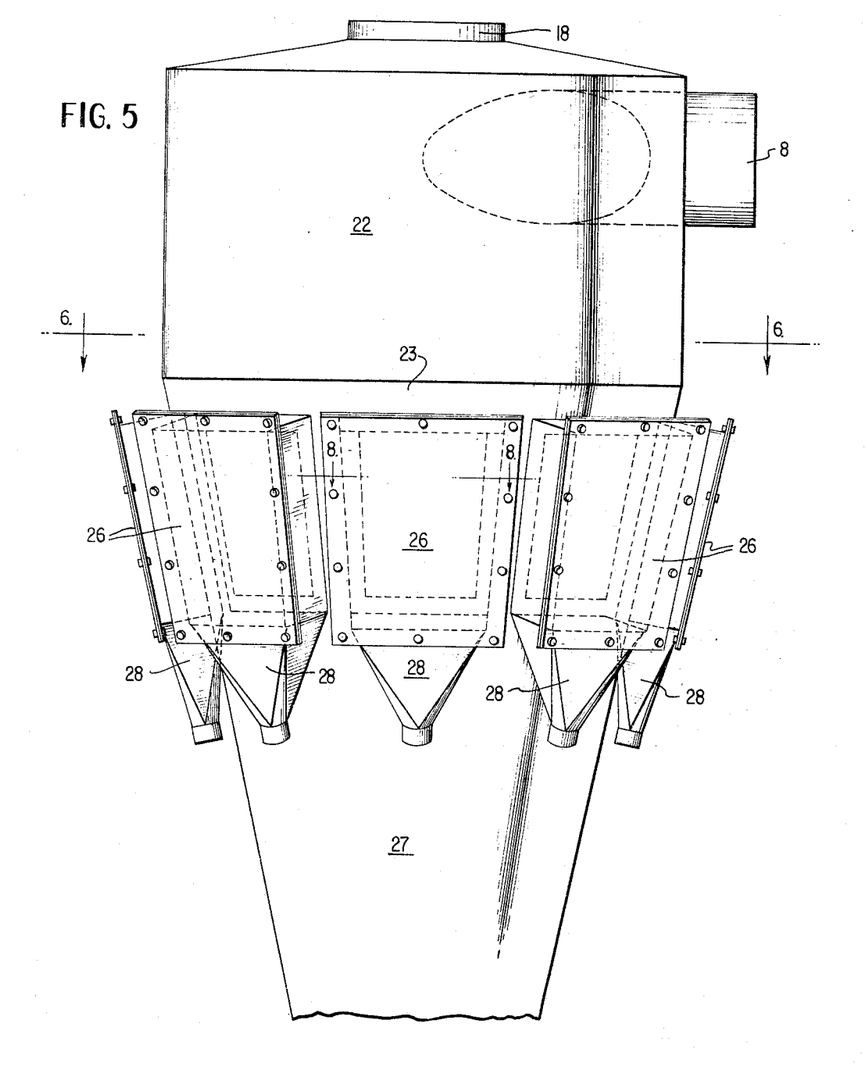
FIGURE 5 is an enlarged elevational view of a screening cyclone for the system of FIGURE 1.
Figure 6:
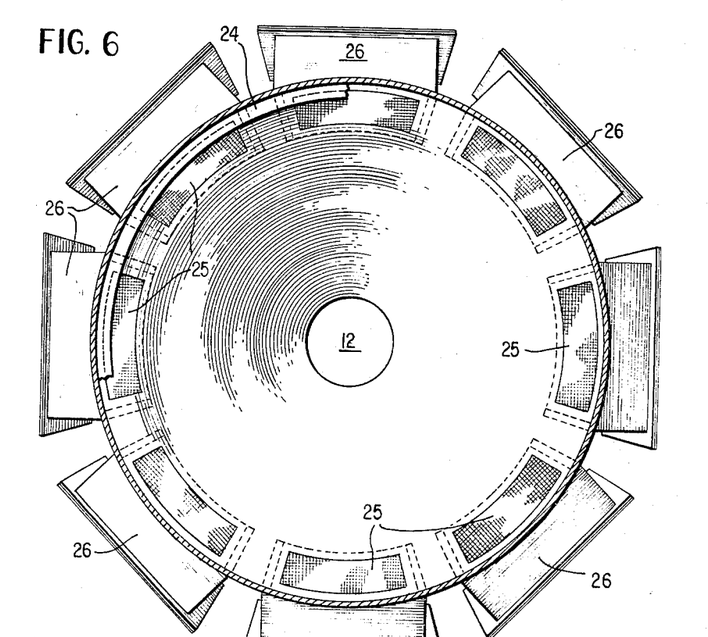
FIGURE 6 is a sectional view taken on line 6—6 of FIGURE 5.
Figure 7:
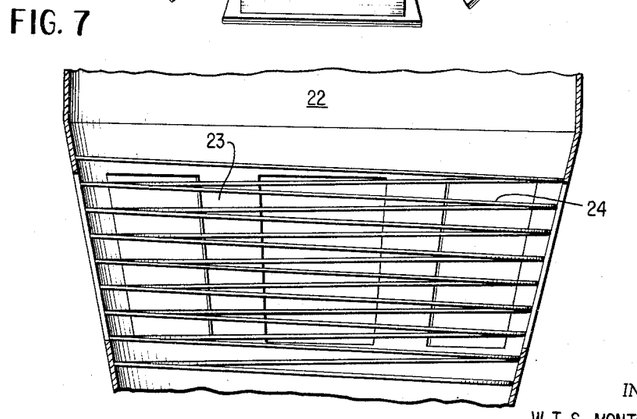
FIGURE 7 is a diagrammatic view of the spiral baffle arrangement associated with the screening cyclone of FIGURE 5.

The screening cyclone 11 is shown in greater detail in FIGURES 5–7. The velocity of the gases created by the blower 6 and controlled by gas flow regulating valves 4, 30 and 31 swirls the materials carried to screening cyclone 11 around the periphery of an inlet chamber 22 and further down into a conical separating chamber 23. Separating chamber 23 has a spiral baffle 24 which repeatedly carries the collected materials across the faces of screened openings 25. The sand particles pass through screened openings 25 into sand particle collecting chambers 26, while the char continues down in the separating chamber 23 into an outlet chamber 27. From outlet chamber 27, the char progresses out the char product discharge tube 12 which leads to the firebox 13. The sand particles collected in the particle collecting chambers 26, fall into particle collecting outlet chambers 28 which in turn empty into said particle collecting tubes 29. These sand particle collecting tubes 29 combine to form a single sand carrier tube 14 which empties into sand cyclone 15.

In the design of this apparatus, is is beneficial to maintain a flow of gas through the screened openings 25, because centrifugal force alone often does not prove sufficient to effectively cause the sand particles to pass through the screened openings. To maintain this flow of gas through the screened openings and to vary the flow velocity thereof, the flow regulating valve 33 is provided in the cyclone gas outlet tube 18. By altering the flow regulating valve 33 to diminish the gas flow through the outlet tube 18, the blower 20 is caused to draw a greater volume of gas through the screened openings 25, the collecting chambers 26, the particle collecting tubes 29 and sand carrier tube 14, the sand cyclone. 15, the gas outlet tube 17 and the joint outlet tube 19.

The spiral baffle 24 across the face of screened openings 25 has been provided to delay the sand and char from going down the separating chamber 23 into the char outlet chamber 27, until they have passed over the face of screened openings several times. By this procedure, all the sand has had a chance to be drawn through screened openings into the sand particle collecting chambers 26.

The automatic double dump valves 10 of FIGURE 1 constitute an important and necessary feature of the sand separator of the present invention and will now be described in greater detail.

Figure 3:
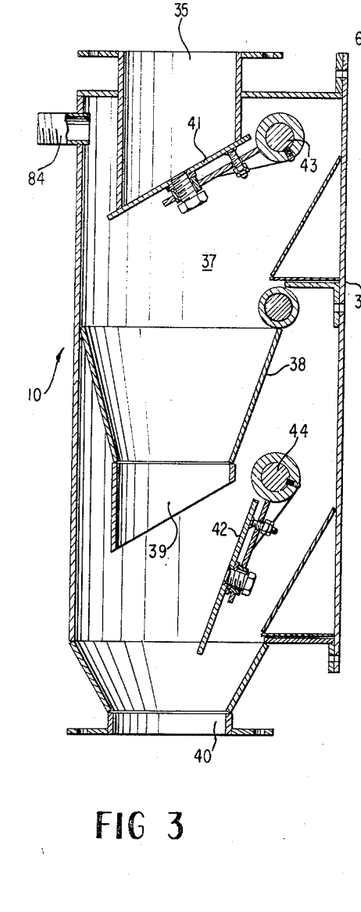
FIGURE 3 is a sectional view in side elevation of the double dump valve of FIGURE 2.

Referring particularly to FIGURES 1 and 3, the double dump valves 10 of the present invention, one of which is illustrated, include an inlet 35 which is connected to a hopper 1 or 2. As previously indicated the hopper is normally attached to the boiler beneath a dust collector thereof and is positioned to collect sand, fly ash charcoal and similar residue from boiler fuel combustion.

Figure 2:
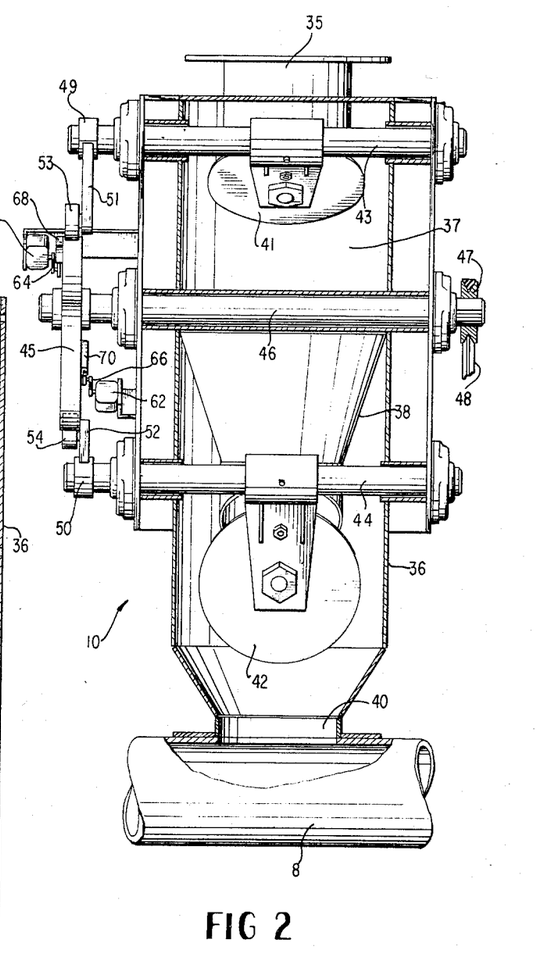
FIGURE 2 is a sectional view in front elevation of the double dump valve for the system of FIGURE 1.

Each double dump valve 10 includes an outer housing 36 which encloses a central chamber 37 into which the inlet 35 opens. The chamber 37 forms a lock chamber, the bottom section of which is defined by inwardly converging walls 38 which extend inwardly from the housing 36 to form an outlet opening 39 for the lock chamber outlet 39 is positioned so that material passing therethrough will also pass through a housing outlet 40 at the bottom of the housing 36. The housing outlet 40 communicates with a material conveying or discharge pipe, which may be either the dust collecting tube 8 or the fuel collecting tube 9.

The passage of material through the double dump valve 10 is controlled by a flapper plate 41 mounted to open or close the inlet opening 35 and a second flapper plate 42 mounted to open or close the outlet opening 39 for the lock chamber 37. The flapper plates 41 and 42, when closed, provide a substantially air tight seal for the inlet opening 35 and outlet opening 39.

The flapper plate 41 is secured to a shaft 43 which extends across the lock chamber 37 and is mounted for rotation upon the housing 36. Similarly, the second flapper plate 42 is secured to a shaft 44 which is rotatively mounted upon the housing 36. The selective rotation of the shafts 43 and 44 determines whether the flapper plates 41 and 42 open or close the inlet and outlet openings to the lock chamber 37.

Figure 4:
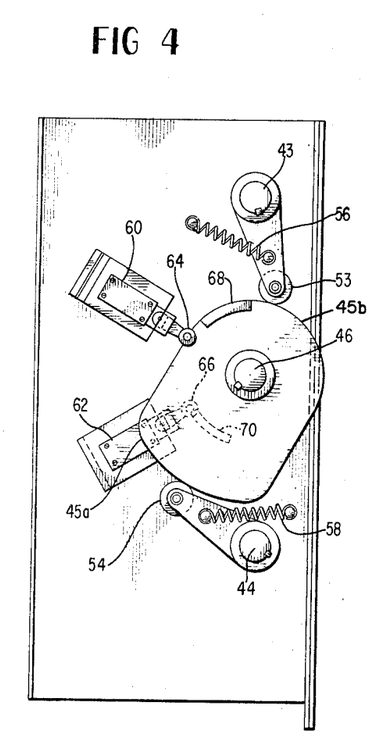
FIGURE 4 is a detailed illustration of the program control system for the double dump valve of FIGURE 2.

As shown by FIGURES 2 and 4, the flapper plates 41 and 42 are operated by a program cam 45 which is secured to a shaft 46 mounted for rotation upon the housing 36. The shaft 46 extends outwardly from either side of the housing 36; one end of the shaft mounting the cam 45 while the opposite end of the shaft mounts a drive pulley 47. The drive pulley is driven by a belt 48 connected to a suitable drive motor, not shown. The belt 48 and drive pulley 47 cause the shaft 46 to rotate, thereby rotating the cam 45. It is obvious that any suitable drive means may be substituted for the belt 48 and pulley 47.

The shafts 43 and 44 for the flapper plates 41 and 42 extend outwardly from the housing 36 adjacent to the cam 45, and secured to the outer end of each of these shafts is a cam follower indicated at 49 and 50. The cam followers 49 and 50 include operating arms 51 and 52 which project from the shafts 43 and 44 to a position adjacent the cam. 45. On the outer end of the arms 51 and 52 are mounted rollers, indicated at 53 and 54, or similar members for contacting the surface of the cam 45. As the cam 45 is turned by the shaft 46, the rollers 53 and 54 follow the cam surface and cause the arms 51 and 52 to sequentially rotate the shafts 43 and 44 to move the flapper plates 41 and 42. The cam surface has a high 45a and a low 45b which control the operation of the flapper plates 41 and 42. The flapper plates are thereby caused to selectively open and close the input and outut openings 35 and 39 to the lock chamber 37. To insure that the cam followers 49 and 50 closely follow the surface of the cam 45, springs 56 and 58 may be secured between the cam followers and the housing 36 to bias the cam followers against the surface of the program cam.

In addition to the flapper plates 41 and 42, the cam 45 also operates limit switches 60 and 62 which are mounted upon the housing 36 adjacent the cam 45. These limit switches include switch operating arms 64 and 66 which extend to a position adjacent switch operating cam surfaces 68 and 70 formed on the cam 45. As the cam rotates, these switch operating surfaces come into contact with the switch operating arms 64 and 66 to selectively close the limit switches.

Figure 8:
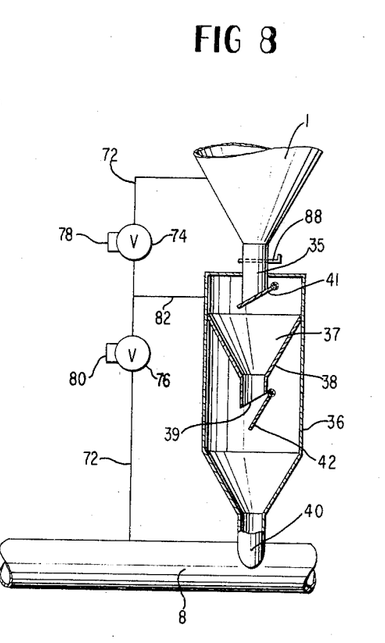
FIGURE 8 is a diagrammatic representation of the double dump valve system of the present invention.
Figure 9:
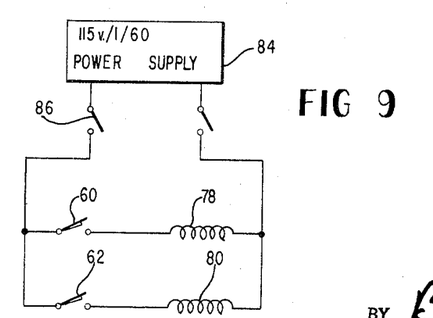
FIGURE 9 is a schematic diagram of the electronic control for the valve pressure equalizing system employed with the double dump valve of FIGURE 2.

The pressure equalizing system for the double dump valve may best be understood by referring to FIGURES 8 and 9, wherein it will be noted that a pipe or similar conduit 72 extends between the hopper 1 and the material conveying line 8, with one end thereof opening into the material conveying line and the opposite end opening into the hopper. Positioned in the conduit 72 are two spaced valves 74 and 76 which, for purposes of illustration, are shown as normally closed, solenoid operated valves which are controlled by electric solenoids 78 and 80 connected thereto. It is of course obvious that suitable mechanically controlled valves could be substituted for the solenoid controlled valves 74 and 76.

Extending into the conduit 72 between the valves 74 and 76 is a second conduit 82 having one end opening into the lock chamber 37 and the opposite end opening into the conduit 72. The conduit 82 may be secured to the housing 36 by means of a pipe nipple 84 as illustrated in FIGURE 3.

As will be noted from FIGURE 9, the solenoids 78 and 80 for controlling the valves 74 and 76 are connected across a power supply 84. The limit switch 60 is connected in series with the solenoid 78, while the limit switch 62 is connected in series with the solenoid 80, and it will be apparent that the limit switches control the energization of the solenoids 78 and 80 and the operation of the normally closed valves 74 and 76. A disconnect switch 86 may be provided in the input circuit from the power source 84 to permit power to be selectively connected or removed to the solenoid-limit switch circuit.

In the operation of a double dump valve 10, the programmed cam 45 controls both the limit switches 60 and 62 and the flapper plates 41 and 42 so that light fly ash charcoal, sand and other residue may be effectively removed by gravity from the hopper 1 and deposited in the material conveying line 8. Without the pressure equalizing system of FIGURES 8 and 9, such gravity removal would be impossible, for a pressure which is positive with respect to that in the hopper 1 exists in the material conveying line 8, and also normally exists in the lock chamber 37. Therefore, when the flapper plate 41 is opened, an upward air flow is created from the lock chamber 37 through the input opening 35 and into the hopper 1, and this air flow prevents the residue in the hopper from falling by gravity into the lock chamber. A similar condition occurs when the flapper plate 42 is opened and an upward air flow passes into the lock chamber from the material conveying line 8.

To accomplish gravity flow of material from the charcoal hopper 1 to the material conveying line 8, the cam 45 programs the double dump valve through a specific sequence of operation to accomplish pressure equalization within the lock chamber 37 in timed relationship with the operation of the flapper plates 41 and 42. While it is recognized that the timing of this operational sequence may be varied by changing the programming of the cam 45 and varying the speed of the cam, the sequential steps performed remain the same. This operational sequence is started with the flapper plates 41 and 42 in the closed position so that the input opening 35 and the output opening 39 for the lock chamber 37 are sealed. Also, the limit switches 60 and 62 are open so that the normally closed valves 74 and 76 remain closed.

Shortly after the cam 45 begins to move into the programmed operational sequence, the switch operating cam surface 68 contacts the actuating arm 64 of the limit switch 60 and closes the limit switch. Thus, power is furnished to the solenoid 78 through the limit switch and the normally closed valve 74 is opened allowing any pressure differential between the lock chamber 37 and the hopper 1 to be neutralized. With the valve 74 open, the flapper plate 41 is by-passed and the lock chamber is directly connected to the hopper 1 through the conduit 82, the valve 74, and the conduit 72. It will be noted that the conduit 72 enters the hopper at a point close to the upper extremity of the hopper so that material in the hopper will not interfere with the equalization of pressure occurring through the conduit 72.

Shortly after the valve 74 opens and equalization of pressure occurs between the hopper 1 and the lock chamber 37, the high 45a of the cam 45 moves beneath the roller 53, thereby rotating the shaft 43 to move the flapper plate 41 away from the input opening 35. This permits material in the hopper to fall by gravity into the lock chamber. As the pressure between the hopper and the lock chamber has been equalized, there is no upward current of air created from the lock chamber into the hopper when the flapper plate 41 is opened, and there is no hindrance to the gravity flow of material from the hopper.

While material is passing from the hopper into the lock chamber 37, the cam surface 68 moves from beneath the actuating arm 64 of the limit switch 60 and the limit switch is permitted to open. The electrical circuit to the solenoid 78 is now broken, and the valve 74 again moves to the closed position blocking the conduit 72.

The high 45a of the cam 45 continues to move beneath the roller 53 holding the flapper plate 41 open for a period determined by the width of the high. As the high of the cam moves from beneath the roller 53, the flapper plate 41 will close and the initial condition existing at the beginning of the operational sequence for the double dump valve, with both flapper plates closed, is again reinstated. However, shortly after the reclosing of the flapper plate 41, the cam surface 70 contacts the actuating arm 66 for the limit switch 62, and the limit switch is thereby closed. Currest now flows through the limit switch 62 to the solenoid coil 80, and the solenoid operated valve 76 is now opened. This results in pressure equalization between the material conveying line 8 and the lock chamber 37 around the closed flapper plate 42 by way of the conduit 72, the open valve 76, and the conduit 82. Thus the lower hopper pressure established in the lock chamber is now changed to the higher pressure existing in the material conveying line.

As the cam 45 continues to rotate, the high 45a moves beneath the roller 54, rotating the shaft 44, and opening the flapper plate 42. The material in the lock chamber 37 is now permitted to fall by gravity to the material conveyor line 8 which in turn conveys such material to the screening cyclone 11. Again, free gravity flow of the material from the lock chamber into the material conveying line is accomplished due to the previous equalization of pressure between the material conveying line and lock chamber, for no upward air currents are created upon the opening of the flapper plate 42 to interfere with such gravity flow.

As the cam 45 continues to move, the cam surface 70 passes from beneath the limit switch actuating arm 66 and the limit switch 62 is again opened. Current is now removed from the solenoid 80 and the solenoid operated valve 76 again closes.

Subsequently, the high 45a of the cam moves from beneath the roller 54 and the flapper plate 42 closes to seal the output opening 39 in the lock chamber 37. The operating sequence for the double dump valve is now complete and as the cam begins a new cycle of rotation, a subsequent identical sequence of operation is begun.

In the event that it becomes necessary to repair or to replace any of the components of a double dump valve 10, it is desirable to provide means to temporarily block the input opening 35 while repairs are being made. For this purpose, a cutoff slide gate 88, or similar closure member indicated diagrammatically in FIGURE 8 may be provided in the input opening above the flapper plate 41. This slide gate can be adapted for selective operation to close the input opening when it becomes necessary to remove the flapper plates 41 or 42, or any other component of the double dump valve for repair or replacement.

It will be apparent to those skilled in the art that the method and apparatus of the present invention effectively accomplish the discharge of light sand and fly ash charcoal by gravity into an area of higher pressure. By following this method, and first equalizing the pressure between a lock chamber and a hopper before opening the inlet valve into the chamber, and then by subsequently accomplishing a similar pressure equalization process between the lock chamber and a discharge line, the upward air current which would normally be formed upon the opening of the discharge valves is eliminated. Thus, free gravity discharge of extremely light material may be effectively accomplished. Subsequently, the novel sand separating system separates the sand and charcoal.

I claim:

1. In a boiler including a firebox for burning sand containing fuel, a stack for receiving products of combustion from said boiler and collector means mounted within said boiler between said firebox and stack to collect sand and combustible char circulating from said firebox, a sand separating fuel reclamation system for returning combustible char to said firebox comprising pressure generating means to create a flow of gas, sand separating means, conduit means connected to receive sand and char from said collector means and extending between said collector and sand separating means, said conduit means being connected to receive said flow of gas from said pressure generating means to cause said gas flow to propel said sand and char from said collector means under pressure into said sand separating means, said sand separating means including means to separate said sand from said char, first output means to eject said sand from said sand separating means, second output means to eject said char from said sand separating means, and means connected between said second output means and said firebox to convey said char into said firebox.

2. The combination of claim 1 wherein sand collecting means is connected to receive sand from said first output means, gas exhaust means connected to said sand collecting means to create a flow of gas therefrom, exhaust conduit means connected between said gas exhaust means and said sand separating means whereby said exhaust means creates a flow of gas from said sand separating means, and gas flow control means provided in said exhaust conduit means to control the flow of gas therethrough.

3. The combination of claim 2 wherein said pressure generating means includes input means connected to said stack, whereby said pressure generating means creates a flow of gas from said stack to said sand separating means.

4. The combination of claim 3 wherein said exhaust means is connected to said stack, said exhaust means operating to discharge gas from said sand separating and sand collecting means into said stack.

5. The combination of claim 1 wherein said sand separating means includes a centrifugal separator having an outer wall forming an enclosed central separating chamber with an upper end and a lower end, said conduit means being connected to direct said sand and char into the upper end of said central separating chamber, said means to separate the sand from the char including a plurality of openings formed in the outer wall of said separator and screen means covering each such opening, means to create a flow of gas from said central separating chamber through said plurality of openings, said first output means being connected to said separator means to receive sand passing through said openings.

6. The combination of claim 5 wherein the lower portion of said centrifugal separator outer wall is substantially conical in form, said plurality of openings being formed in said conical wall portion and material directing means mounted on the inner surface of said separator outer wall to direct said combined sand and char repeatedly across the face of the screen means covering said plurality of openings, said material directing means including a continuous spiral baffle extending around the periphery of said central chamber, at least two convolutions of said baffle passing across the face of each said opening in the outer wall of said centrifugal separator.

7. In a bark burning boiler including a firebox for burning sand containing bark, a stack for receiving products of combustion from said boiler and collector means mounted within said boiler between said firebox and stack to collect sand and combustible char circulating from said firebox, a sand separating fuel reclamation system for returning combustible char to said firebox comprising blower means to create a flow of gas, blower input means connected between said stack and said blower means, sand separating means, conduit means connected to receive sand and char from said collector means and extending between said collector and sand separating means, said conduit means being connected to receive said flow of gas from said blower means to cause said gas flow to propel said sand and char from said collector means into said sand separating means, said sand separating means including a centrifugal separator having an outer wall forming an enclosed separating chamber with an upper end to receive said sand and char and a lower end, the lower portion of said outer wall being substantially conical in form, a plurality of openings formed in said conical well portion, screen means covering each such opening, a spiral baffle including a plurality of convolutions extending around the periphery of said central chamber, a number of said convolutions passing across the face of each such screen means to direct the combined sand and char repeatedly across the screen means, and a char outlet at the bottom of said centrifugal separator below said plurality of openings, sand collecting means connected to receive sand passing through the screen means on each of said openings in said centrifugal separator, said sand collecting means including an enclosed collection chamber connected to receive sand at the upper end thereof and discharge means at the lower end of said collection chamber to discharge sand therefrom, gas exhaust means connected to exhaust gas from said sand collection chamber, said gas exhaust means creating a flow of gas from the separating chamber of said centrifugal separator through said screen means and into said sand collection chamber and conduit means connected between said gas exhaust means and the upper end of said separating chamber, said gas exhaust means being connected to exhaust gas from said sand collection chamber and separating chamber into said stack.

8. The combination of claim 1 wherein said collector means includes a hopper to receive said sand and char, a lock chamber mounted beneath said hopper and above said conduit means, said lock chamber including a material inlet communicating with said hopper and a material outlet communicating with said conduit, inlet closure means mounted in said lock chamber to selectively open or close said inlet, outlet closure means mounted in said lock chamber to selectively open and close said outlet, a pressure equalizing system connected to said lock chamber including first equalizing means operable to equalize the pressure in said hopper and lock chamber and second equalizing means operable to equalize the pressure in said lock chamber and conduit, and control means operating to first cause said first equalizing means to equalize pressure between said hopper and lock chamber and to subsequently open said inlet closure means and to next cause said second equalizing means to equalize pressure between said conduit and lock chamber and to subsequently open said outlet closure means.

9. In a boiler including a firebox for burning fuel, collector means including a hopper mounted within said boiler for collecting light materials produced by combustion of said fuel; and a discharge unit for conveying said light materials, said discharge unit having an internal pressure which is higher than the pressure within said hopper, a double dump valve mounted between said hopper and discharge unit for discharging by gravity the light material from said hopper into said discharge unit comprising a lock chamber mounted beneath said hopper and above said discharge unit, said lock chamber including a material inlet communicating with said hopper and a material outlet communicating with said discharge unit, inlet closure means mounted in said lock chamber to selectively open or close said inlet, outlet closure means mounted in said lock chamber to selectively open and close said outlet, a pressure equalizing system connected to said lock chamber including first equalizing means selectively operable to equalize the pressure in said collector hopper and lock chamber and second equalizing means selectively operable to equalize the pressure in said lock chamber and discharge unit, and control means operating to cause equalization in pressure between said hopper and said lock chamber and the subsequent opening of said inlet closure means and to next cause equalization of pressure between said lock chamber and discharge unit and the subsequent opening of said outlet closure means.

10. The combination of claim 9 wherein said control means includes a program controller connected to activate said inlet and outlet closure means and said first and second equalizing means in timed sequence.

11. The combination of claim 10 wherein said first equalizing means includes a conduit connecting the interior of said lock chamber with the interior of said hopper and first valve means for selectively opening or closing said conduit, and said second equalizing means includes a conduit connecting the interior of said lock chamber with the interior of said discharge unit and second valve means for selectively opening or closing said second conduit.

12. The combination of claim 11 wherein said control means includes closure operating means connected to open said inlet and outlet closure means, activating means connected to open said first and second valve means, said program controller including a rotating cam means having cam surfaces adapted to operate said closure operating means and said valve activating means, said rotating cam means initiating a programmed operation of said double dump valve which includes in sequence the equalization of pressure between said hopper and said lock chamber, the opening of said inlet closure means for a predetermined period, the equalization of pressure between said lock chamber and said discharge unit after the closing of said inlet closure means, and the subsequent opening of said outlet closure means for a predetermined period.

13. The combination of claim 12 wherein the actuating means for said first and second valve means includes electric solenoid operators connected to said first and second valve means, cam operated switch means mounted for operation by said rotating cam means and electrically connected to said solenoid operators, and a power source connected to said cam operated switch means.

14. The combination of claim 13 wherein said inlet and outlet closure means include normally closed, substantially air-tight valve means mounted within said lock chamber, and cam operated, mechanical valve actuators connected to selectively open said air-tight valve means upon contact between said actuator and a cam surface of said rotating cam means.

References Cited

UNITED STATES PATENTS 2,493,960  1/1950  Gladden.
2,917,011  12/1959  Korner __________ 110—165 X

FOREIGN PATENTS 645,324  6/1928  France.

KENNETH W. SPRAGUE, Primary Examiner

U.S. Cl. X.R.

209—144